US012312476B2

(12) United States Patent
Kaiser et al.

(10) Patent No.: US 12,312,476 B2
(45) Date of Patent: May 27, 2025

(54) PROCESSING AND PURIFICATION OF CARBONACEOUS MATERIALS

(71) Applicant: Fraunhofer-Gesellschaft zur Förderung der angewandten Forschung e. V., Munich (DE)

(72) Inventors: Christian Kaiser, Valley (DE); Volker Thome, Valley (DE); Severin Seifert, Valley (DE); Sebastian Dittrich, Valley (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 735 days.

(21) Appl. No.: 17/624,420

(22) PCT Filed: Jul. 8, 2020

(86) PCT No.: PCT/EP2020/069292
§ 371 (c)(1),
(2) Date: Jan. 3, 2022

(87) PCT Pub. No.: WO2021/005124
PCT Pub. Date: Jan. 14, 2021

(65) Prior Publication Data
US 2022/0372301 A1 Nov. 24, 2022

(30) Foreign Application Priority Data
Jul. 10, 2019 (DE) .......................... 102019210217.4

(51) Int. Cl.
*C09C 1/56* (2006.01)
*C09C 1/48* (2006.01)

(52) U.S. Cl.
CPC ............... *C09C 1/56* (2013.01); *C09C 1/482* (2013.01); *C09C 1/487* (2013.01)

(58) Field of Classification Search
CPC .................................. C09C 1/487; C09C 1/56
See application file for complete search history.

(56) References Cited

U.S. PATENT DOCUMENTS

| | | | |
|---|---|---|---|
| 5,976,484 | A | 11/1999 | Teng et al. |
| 8,921,600 | B2 | 12/2014 | Wigbers |
| 2003/0022945 | A1 | 1/2003 | Bowers et al. |
| 2004/0047779 | A1 | 3/2004 | Denison |
| 2008/0152576 | A1 | 6/2008 | Zhang |
| 2012/0263641 | A1 | 10/2012 | Chung |
| 2012/0296121 | A1 | 11/2012 | Wigbers |
| 2014/0162873 | A1* | 6/2014 | Gu ................. B01J 35/647 423/460 |
| 2014/0311921 | A1 | 10/2014 | Howard et al. |
| 2015/0139889 | A1 | 5/2015 | Horn |
| 2015/0307714 | A1 | 10/2015 | Cheng |
| 2017/0311921 | A1 | 11/2017 | Feuerlein et al. |
| 2018/0320082 | A1 | 11/2018 | Duncan |

FOREIGN PATENT DOCUMENTS

| | | |
|---|---|---|
| CA | 2836399 A1 | 11/2012 |
| CN | 102583403 A | 7/2012 |
| CN | 104229788 A | 12/2014 |
| CN | 104884166 A | 9/2015 |
| CN | 105793002 A | 7/2016 |
| CN | 108384287 A | 8/2018 |
| CN | 108439390 A | 8/2018 |
| CN | 109266376 A | 1/2019 |
| DE | 10297077 B4 | 8/2014 |
| EP | 0802247 A2 | 10/1997 |
| EP | 1914276 A1 | 4/2008 |
| EP | 2831182 A2 | 2/2015 |
| EP | 3192837 A1 | 7/2017 |
| GB | 1134629 A | 11/1968 |
| JP | 50151201 | 12/1975 |
| JP | H09286938 A | 11/1997 |
| WO | 2004046256 A1 | 6/2004 |
| WO | 2005090233 A2 | 9/2005 |
| WO | 2013130772 A1 | 9/2013 |
| WO | 2013175488 A2 | 11/2013 |
| WO | 2019/202465 A1 | 10/2019 |

OTHER PUBLICATIONS

Dong et al., "Chemically treated carbon black waste and its potential applications", Journal of Hazardous Material 321, 2017 pp. 62-72.
Office Action with English translation for Japanese Patent Application No. 2021-576292 mailed Mar. 27, 2023, 6 pages.
English translation of Office Action in Chilian Patent Application No. 202200017 dated Jul. 22, 2023, 24 pages.
International Search Report for PCT/EP2020//06929 mailed Nov. 17, 2020, 6 pages.

* cited by examiner

*Primary Examiner* — Stuart L Hendrickson
(74) *Attorney, Agent, or Firm* — Lowenstein Sandler LLP

(57) ABSTRACT

The present invention relates to a process for the processing and/or purification of carbon black comprising the steps of: a) providing carbon black containing impurities b) providing an aqueous fluid comprising a nitrogen hydride c) providing an alkali metal hydroxide and/or an alkali metal d) contacting the mixture of step a), the fluid of step b) and the alkali metal hydroxide and/or alkali metal of step c) e) subjecting the composition obtained in step d) to an elevated temperature in the range of 80 to 240° C. and an elevated pressure in the range of 5 to 50 bar f) separating a carbonaceous solid from the composition obtained in step e). The present invention further relates to the use of a nitrogen hydride as a dispersing agent for producing and/or stabilizing an aqueous suspension.

20 Claims, No Drawings

PROCESSING AND PURIFICATION OF CARBONACEOUS MATERIALS

CROSS-REFERENCE TO RELATED APPLICATION(S)

The present application is a national stage entry under 35 U.S.C. § 371 of International Application No. PCT/EP2020/069292, filed on Jul. 8, 2020, which claims priority to German Patent Application No. 102019210217.4, filed on Jul. 10, 2019. The contents of these applications are hereby incorporated by reference in their entirety.

FIELD OF THE INVENTION

The present invention relates to a process for the processing and/or purification of carbonaceous solids and to the use of a nitrogen hydride as a dispersing agent for the production and/or stabilisation of an aqueous suspension.

BACKGROUND OF THE INVENTION

Carbon-rich materials such as soot, activated carbon, certain pyrolysis products, graphite electrodes and numerous other graphite-based materials are of great industrial importance.

An important carbon-rich material is, for example, industrial soot, which is also known as carbon black. In contrast to conventional soot, carbon black is produced by targeted pyrolysis of carbonaceous materials. These specific manufacturing processes allow the synthesis of carbon black particles in the nanometre range, whose primary particle size and surface structure can be adapted to the respective areas of application. The annual production of carbon black was about 8 million tons in 1996 and is estimated to increase to over 15 million tons by 2022. Carbon black is used primarily as an additive in numerous rubber products (Rubber Black) and as a colorant for plastics, paints, coatings and inks (Pigment Black). With almost 85% of the world's annual production, the majority of its use is in the tire industry. The production of newly manufactured carbon black (virgin carbon black) requires considerable amounts of raw materials and energy, and generates considerable amounts of carbon dioxide. At the same time, the European Union, for example, produces around 3.2 million tons of scrap tyres per year, and the United States of America even produces 4.4 million tons of scrap tyres per year. Efforts have already been made to recycle carbon black from old materials such as scrap tyres. Usually, known recycling processes are based on the pyrolysis of the waste material followed by the processing of the pyrolysis residue obtained. However, the thus obtained carbon black (recovered carbon black) has a carbon content of only approx. 80% compared to newly produced carbon black, and is not yet an adequate alternative. In particular, the recovered carbon black often contains a high proportion of ash, which usually consists of zinc sulphide, zinc oxide, silicon dioxide and/or aluminum oxide. This high ash content limits the possible applications and thus reduces the value of the recycled product. When reused in tire manufacturing, the ash components in recovered carbon black cause, for example, a decrease in the strength and durability of the rubber. When used as a colorant for plastics, paints, lacquers or inks, the lower color or black value of the recovered carbon black is a limitation.

For example, a process for removing ash from scrap tyres is known from the US patent application US 20150307714 A1. The Chinese patent application CN 109266376 relates to a process for recycling and dissolving scrap tyres using peroxides and organic solvents at elevated temperature and pressure. The Chinese patent application CN108384287 also refers to a process for recycling and dissolving scrap tyres. The US patent application US 2018320082 A1 relates to a process for recycling scrap tyres using microwave radiation. From the international patent application WO 2013175488 A2, a process for providing carbon black with a reduced sulphur content is known.

One disadvantage of the known processes is, for example, the use of high acid concentrations or organic solvents, which are problematic from a health, ecological or handling point of view. In addition, prior art processes often have long extraction times and/or only allow the recovery of structurally and morphologically modified low quality carbon black.

The development of a novel process for the processing and purification of carbonaceous materials is desirable, which does not have the previous disadvantages. There is a need for a process for the efficient processing and purification of carbonaceous materials, especially carbon black. There is also a need for a process for the processing and purification of carbonaceous materials, especially carbon black, which does not require high acid concentrations or organic solvents. There is also a need for a process for the processing and purification of carbonaceous materials, especially carbon black, which does not involve long extraction times and/or allows the recovery of structurally and morphologically largely unchanged carbon-rich materials, especially carbon black. Furthermore, a process for the processing and purification of carbonaceous materials, especially carbon black, is required which provides a product of high purity and/or low ash content. In particular, there is a need for a process for the recovery and purification of carbon black from scrap tyres, which provides recovered carbon black which is similar or ideally has the same quality as a newly produced carbon black, and in particular has a low ash and/or sulphur content and largely unchanged physical properties with respect to the carbon black originally used.

SUMMARY OF THE INVENTION

It is therefore the objective of the present invention to provide a process for the processing and purification of carbonaceous materials which does not have the previous disadvantages. A further objective is to provide a process for the efficient processing and purification of carbonaceous materials, especially carbon black. A further objective is to provide a process for the processing and purification of carbonaceous materials, in particular carbon black, which does not require the use of high acid concentrations or organic solvents. Another objective is to provide a process for the processing and purification of carbonaceous materials, especially carbon black, which does not involve long extraction times and/or allows the recovery of structurally and morphologically largely unchanged carbon black. A further objective is to provide a process for the processing and purification of carbonaceous materials, especially carbon black, which provides a product of high purity and/or low ash content. In particular, one objective of the present invention is to provide a process for the recovery and purification of carbon black from used tyres, which provides recovered carbon black which is of similar or has ideally the same quality as a newly produced carbon black, and in particular has a low ash and/or sulphur content as well as largely unchanged physical properties with respect to the carbon black originally used.

One or more of the preceding objectives is solved by the process for the processing and/or purification of carbonaceous solids according to the present invention. The inventive process for the processing and/or purification of carbonaceous solids comprises the steps of:
a) providing a mixture comprising a carbonaceous solid and at least one inorganic compound,
b) providing an aqueous fluid comprising a nitrogen hydride,
(c) providing an alkali hydroxide and/or an alkali metal,
d) contacting the mixture of step a), the fluid of step b) and the alkali hydroxide and/or alkali metal of step c),
e) subjecting the composition obtained in step d) to a reduced or increased temperature and/or to a reduced or increased pressure,
f) separating a carbonaceous solid from the composition obtained in step e).

The inventors have surprisingly found that the process of the present invention can be used to selectively remove inorganic compounds, such as minerals and/or salts, from a carbon-rich solid mixture, or a suspension thereof. Furthermore, the inventors have found that the physical properties of the carbon being present in the initial mixture do not change, or do not significantly change by performing the inventive process. Thus, the inventive process allows the provision of a solid with a very high carbon content and high functionality for further processing or application at a later stage.

DETAILED DESCRIPTION OF THE INVENTION

Step a)

In step a) of the inventive process, a mixture is provided which comprises a carbonaceous solid and at least one inorganic compound.

For the purposes of this invention, an "inorganic compound" is a compound which does not contain carbon-hydrogen bonds, and preferably does not contain carbon.

For the purposes of this invention, as a carbonaceous "solid" it is understood a carbonaceous material which is poorly soluble in water, preferably very poorly soluble in water, and more preferably not soluble in water. "Poorly water soluble" as used herein refers to a material which dissolves to 1 to 10 g/L ($H_2O$) at 25° C. "Very poorly water soluble" as used herein relates to a material that dissolves to 0.1 to 1 g/L ($H_2O$) at 25° C., and "water insoluble" as used herein refers to a material that dissolves to less than 0.1 g/L ($H_2O$) at 25° C. (e.g. in the range of 0.0001 to 0.1 g/L ($H_2O$)).

The carbonaceous solid can consist of at least 80% (e.g. in a range from 80.0 to 99.8%), preferably at least 90%, more preferably at least 95% (e.g. in a range from 95.0 to 99.8%), of carbon. In one embodiment of the present invention, the carbon-containing solid is present in the crystal modification of graphite.

It is particularly preferred that the carbonaceous solid comprises carbon black, or consists of carbon black. For example, the carbonaceous solid may consist of at least 90%, preferably at least 95%, carbon black. The primary particles of carbon black can have a particle diameter in the range of 1 to 600 nm, preferably 10 to 300 nm. The grain diameter of the primary particles can be measured e.g. by laser diffraction. The primary particles of carbon black can combine to form carbon black aggregates, which can have a diameter in the range of 80 to 800 nm. These carbon black aggregates can in turn form superstructures in the form of carbon black agglomerates. Furthermore, the carbon black can have a specific surface area in the range of 5 to 1500 $m^2/g$, preferably 15 to 600 $m^2/g$, measured according to the BET method. In one embodiment of the present invention, the carbonaceous solid according to step a) consists of carbon black comprising an elemental composition of 90.0 to 99.7% C, 0.1 to 0.6% H, 0.01 to 0.8% S and 0.2 to 3.5% O.

The at least one inorganic compound is preferably two or more inorganic compounds. The at least one inorganic compound may be a mineral and/or a salt, and is preferably a mixture of minerals and/or salts. In one embodiment of the present invention, the at least one inorganic compound is selected from the group consisting of one or more metal sulphides, one or more metal oxides, one or more silicates, and mixtures thereof. For example, the at least one inorganic compound may comprise, or consist of, zinc sulphide, zinc oxide, silicon dioxide, silicates, aluminum oxide, or mixtures thereof.

The at least one inorganic compound may be poorly soluble in water, preferably very poorly soluble in water, and most preferably insoluble in water. The above definitions of "poorly soluble in water", "very poorly soluble in water" and "insoluble in water" apply.

The at least one inorganic compound is preferably an inorganic compound selected from the group consisting of one or more metal sulphides, one or more metal oxides, one or more silicates and mixtures thereof, wherein the at least one inorganic compound is at least poorly water soluble, more preferably at least very poorly water soluble, and most preferably insoluble in water.

The mixture can be in the form of a solid mixture or a suspension. In one embodiment, the mixture is present as a suspension, preferably an aqueous suspension. In another embodiment, the mixture is present as a solid mixture.

According to one embodiment of the present invention, the mixture of step a) comprises the carbonaceous solid in a molar fraction of more than 50% (e.g. in a range from 50 to 99%), preferably more than 70%, and more preferably more than 80% (e.g. in a range from 80 to 95%), based on the total molar amount of the mixture, and/or the mixture of step a) comprises the at least one inorganic compound in a molar fraction of 1 to 30%, preferably 5 to 20%, based on the total molar amount of the mixture.

In one embodiment of the present invention, the mixture of step a) comprises the carbonaceous solid in a molar fraction of more than 50% (e.g. in a range from 50 to 99%), preferably more than 70%, and more preferably more than 80% (e.g. in a range from 80 to 95%), based on the total molar amount of the mixture, and the at least one inorganic compound in a molar fraction of from 1 to 30%, preferably from 5 to 20%, based on the total molar amount of the mixture.

In a further embodiment of the present invention, the mixture of step a) comprises the carbonaceous solid in more than 50 wt. % (e.g. in a range from 50 to 99%), preferably more than 70 wt. %, and more preferably more than 80 wt. % (e.g. in a range from 80 to 95%), based on the total weight of the mixture, and/or the mixture of step a) comprises the at least one inorganic compound in 1 to 30 wt. %, preferably 5 to 20 wt. %, based on the total weight of the mixture.

In one embodiment of the present invention, the mixture of step a) comprises the carbonaceous solid in an amount of above 50 wt. % (e.g. in a range from 50 to 99%), preferably above 70 wt. %, and more preferably above 80 wt. % (e.g. in a range from 80 to 95%), based on the total weight of the mixture, and the at least one inorganic compound in an amount of from 1 to 30 wt. %, preferably from 5 to 20 wt. %, based on the total weight of the mixture.

In one embodiment of the present invention, the mixture of step a) comprises the carbonaceous solid in an amount of from 70 to 99 wt. %, and more preferably from 80 to 98 wt. %, based on the total weight of the carbonaceous solid and the at least one inorganic compound, and/or the mixture of step a) comprises the at least one inorganic compound in an amount of from 1 to 30 wt. %, preferably from 2 to 20 wt. %, based on the total weight of the carbonaceous solid and the at least one inorganic compound.

In one embodiment of the present invention, the mixture of step a) comprises the carbonaceous solid in an amount of from 70 to 99 wt. %, and more preferably from 80 to 98 wt. %, based on the total weight of the carbonaceous solid and the at least one inorganic compound, and the at least one inorganic compound in an amount of from 1 to 30 wt. %, preferably from 2 to 20 wt. %, based on the total weight of the carbonaceous solid and the at least one inorganic compound.

The percentage by weight of the carbonaceous solid in the mixture of step (a) and/or of the at least one inorganic compound in the mixture of step (a) may be determined according to the standard method '*ASTM D150615-*; *Standard Test Methods for Carbon BlackAsh-Content*'.

In one embodiment of the present invention, the mixture of step a) is obtained by pyrolysis of a carbonaceous material. It is preferred that the mixture of step a) is obtained by pyrolysis of scrap tyres or biomass, preferably scrap tyres. Thus, according to a preferred embodiment, the mixture of step a) is obtained by pyrolysis of scrap tyres. According to another embodiment, the mixture of step a) is obtained by pyrolysis of biomass.

According to another preferred embodiment, the mixture of step a) is obtained from the pyrolysis of scrap tires, and comprises a carbonaceous solid and at least one inorganic compound, wherein the carbonaceous solid comprises carbon black and the at least one inorganic compound is an inorganic compound selected from the group consisting of one or more metal sulphides, one or more metal oxides, one or more silicates, and mixtures thereof.

According to another preferred embodiment, the mixture of step a) is obtained from the pyrolysis of scrap tires, and comprises a carbonaceous solid and at least one inorganic compound, wherein the carbonaceous solid comprises carbon black, and the at least one inorganic compound comprises an inorganic compound, selected from the group consisting of one or more metal sulphides, one or more metal oxides, one or more silicates, and mixtures thereof, and wherein the at least one inorganic compound is at least poorly water soluble, more preferably at least very poorly water soluble, and most preferably insoluble in water.

According to another preferred embodiment, the mixture of step a) is obtained from the pyrolysis of scrap tires, and comprises a carbonaceous solid and at least one inorganic compound, wherein the carbonaceous solid consists of more than 90% carbon (e.g. in a range from 90 to 99.8%), and the at least one inorganic compound is an inorganic compound selected from the group consisting of one or more metal sulphides, one or more metal oxides, one or more silicates and mixtures thereof, and wherein the mixture comprises the carbonaceous solid in a molar fraction of above 70% and the at least one inorganic compound in a molar fraction of 5 to 20%, based on the total molar amount of the mixture.

According to another preferred embodiment, the mixture of step a) is obtained from the pyrolysis of scrap tires, and comprises a carbonaceous solid and at least one inorganic compound, wherein the carbonaceous solid consists of more than 90% carbon black (e.g. in a range from 90 to 99.8%) and the at least one inorganic compound is an inorganic compound selected from the group consisting of one or more metal sulphides, one or more metal oxides, one or more silicates and mixtures thereof, wherein the mixture comprises the carbonaceous solid in a molar fraction of more than 70% (e.g. in a range from 70 to 95%) and the at least one inorganic compound in a molar fraction of 5 to 20%, based on the total molar amount of the mixture.

According to another preferred embodiment, the mixture of step a) is obtained from the pyrolysis of scrap tires, and comprises a carbonaceous solid and at least one inorganic compound, wherein the carbonaceous solid consists of more than 90% carbon (e.g. in a range from 90 to 99.8%), and the at least one inorganic compound is an inorganic compound selected from the group consisting of one or more metal sulphides, one or more metal oxides, one or more silicates and mixtures thereof, and wherein the mixture comprises the carbonaceous solid in an amount of above 70 wt. % (e.g. in a range from 70 to 95%) and the at least one inorganic compound in an amount of from 5 to 20 wt. %, based on the total weight of the mixture.

According to another preferred embodiment, the mixture of step a) is obtained from the pyrolysis of scrap tires, and comprises a carbonaceous solid and at least one inorganic compound, wherein the carbonaceous solid consists of more than 90% carbon black (e.g. in a range from 90 to 99.8%) and the at least one inorganic compound is an inorganic compound selected from the group consisting of one or more metal sulphides, one or more metal oxides, one or more silicates and mixtures thereof, wherein the mixture comprises the carbonaceous solid in an amount of above 70 wt. % (e.g. in a range from 70 to 95%) and the at least one inorganic compound in an amount of from 5 to 20 wt. %, based on the total weight of the mixture.

Step b)

In step b) of the inventive process, an aqueous fluid comprising a nitrogen hydride is provided. A "nitrogen hydride" in the meaning of the present invention is a chemical substance having at least one nitrogen-hydrogen bond. An aqueous "fluid" in the meaning of the present invention is an aqueous suspension, emulsion, solution or dispersion, preferably an aqueous solution. An "aqueous" fluid in the meaning of the present invention is a water-based fluid, which preferably consists of at least 50% by weight (e.g. in a range of 50 to 95 wt. %), more preferably 75% by weight, of water, based on the total weight of the fluid.

The inventors surprisingly found that the use of an aqueous fluid comprising a nitrogen hydride is beneficial for the stability of the suspension of carbonaceous starting material and the process reagents. Furthermore, the inventors have surprisingly found that the use of the fluid as described herein leads to an improved extraction of inorganic compounds from the carbonaceous starting material.

According to one embodiment of the present invention, the fluid of step b) comprises a nitrogen hydride selected from the group consisting of ammonia, inorganic ammonium salts, primary or secondary organic amines and ammonium salts thereof, and mixtures thereof.

Preferably, the fluid comprises a nitrogen hydride selected from the group consisting of ammonia, ammonium hydroxide, ammonium halides, guanidine, guanidine derivatives and ammonium salts thereof, and mixtures thereof. More preferably, the fluid comprises the nitrogen hydride(s) ammonia and/or ammonium hydroxide, and most preferably ammonium hydroxide.

In one embodiment, the aqueous fluid comprises the nitrogen hydride in a concentration of 0.001 to 16.5 mol/L, preferably from 0.05 to 5 mol/L, and more preferably from 0.09 to 0.9 mol/L. For example, the aqueous fluid may contain the nitrogen hydride in a concentration of 0.05 to 0.25 mol/L.

According to one embodiment of the present invention, the aqueous fluid in step b) is provided in an amount ranging from 2 L (fluid)/1 kg (mixture of step a)) to 200 L (fluid)/1 kg (mixture of step a)), preferably 5 L (fluid)/1 kg (mixture of step a)) to 150 L (fluid)/1 kg (mixture of step a)), and more preferably 10 L (fluid)/1 kg (mixture of step a)) to 100 L (fluid)/1 kg (mixture of step a)).

According to one embodiment of the present invention, the fluid in step b) is provided in an amount ranging from 2 L (fluid)/1 kg (mixture of step a)) to 200 L (fluid)/1 kg (mixture of step a)), preferably 5 L (fluid)/1 kg (mixture of step a)) to 150 L (fluid)/1 kg (mixture of step a)), and more preferably from 10 L (fluid)/1 kg (mixture of step a)) to 100 L (fluid)/1 kg (mixture of step a)), wherein the aqueous fluid contains the nitrogen hydride in a concentration from 0.001 to 16.5 mol/L, preferably from 0.05 to 5 mol/L, and more preferably from 0.09 to 0.9 mol/L The fluid of step b) may contain one or more substances in addition to the nitrogen hydride.

These substances may be adapted to the nature of the inorganic compounds and/or the amount of inorganic compounds in the mixture of step a).

According to an embodiment of the present invention, the fluid comprises one or more substances selected from the group consisting of alcohols, oxidizing agents, acids, nitrates and carbonates.

For example, the fluid may contain one or more alcohols. A water-miscible alcohol such as ethanol is a suitable alcohol.

The fluid may also contain one or more oxidizing agents. Suitable oxidizing agents are for example ozone, iodates, permanganates, peroxides or dichromates.

The fluid may also contain one or more acids. Suitable acids are for example organic acids such as acetic acid and/or oxalic acid, or inorganic acids such as hydrochloric acid, sulphuric acid and/or phosphoric acid. In a preferred embodiment, however, no acid is added to the fluid.

Step c)

In step c) of the inventive process, an alkali hydroxide and/or an alkali metal is provided.

Preferably, an alkali hydroxide is provided in step (c). The alkali hydroxide can be provided as a solid or in the form of a solution or suspension. It is preferred that the alkali hydroxide is provided as a solid. In principle, the alkali hydroxide can be any known alkali hydroxide. However, it is preferred that the alkali hydroxide is selected from the group consisting of LiOH, NaOH, KOH or a mixture thereof, more preferably from the group consisting of NaOH, KOH or a mixture thereof. Most preferably, NaOH is used as the alkali hydroxide.

In another embodiment, an alkali metal, preferably sodium, is provided in step c).

According to one embodiment of the present invention, the alkali hydroxide and/or alkali metal in step c) is provided in a molar ratio to the inorganic compounds of the mixture of step a) in the range of from 0.25:1 to 2:1, preferably from 0.5:1 to 1.5:1, more preferably from 0.75:1 to 1.25:1, and most preferably from 0.95:1 to 1.05:1.

According to one embodiment of the present invention, the alkali hydroxide, preferably NaOH, is provided in step c) in a molar ratio to the inorganic compounds of the mixture of step a) ranging from 0.25:1 to 2:1, preferably from 0.5:1 to 1.5:1, more preferably from 0.75:1 to 1.25:1, and most preferably from 0.95:1 to 1.05:1.

According to one embodiment of the present invention, the alkali hydroxide, preferably NaOH, is provided in step c) in a molar ratio to the silicates being present in the mixture according to step a) ranging from 0.25:1 to 2:1, preferably from 0.5:1 to 1.5:1, more preferably from 0.75:1 to 1.25:1, and most preferably from 0.95:1 to 1.05:1.

According to another embodiment, the alkali hydroxide, preferably NaOH, is provided in step c) in stoichiometric amounts to the inorganic compounds of the mixture according to step a). According to another embodiment, the alkali hydroxide, preferably NaOH, is provided in step c) in stoichiometric amounts to the silicates being present in the mixture according to step a).

Step d)

In step d) of the inventive process, the mixture of step a), the aqueous fluid of step b) and the alkali hydroxide and/or alkali metal of step c) are brought into contact.

With regard to the possible and preferred embodiments of the mixture according to step a), the aqueous fluid according to step b) and the alkali hydroxide and/or alkali metal according to step c), reference is made to the explanations in the previous sections.

The provided substances can be brought into contact in step (d) without active mixing, for example, without using a stirring unit. However, the provided substances may also be mixed in step (d). In a preferred embodiment, step d) of the present invention comprises mixing the mixture of step a), the fluid of step b) and the alkali hydroxide and/or alkali metal of step c).

The contacting of the provided substances may be carried out in any order, or simultaneously. In one embodiment, the mixture of step a) is first brought into contact with the aqueous fluid of step b) and then with the alkali hydroxide and/or alkali metal of step c). In a further embodiment, the aqueous fluid of step b) is first brought into contact with the alkali hydroxide and/or alkali metal of step c) and then with the mixture of step a). In one embodiment, the mixture of step a) is simultaneously brought into contact with the aqueous fluid of step b) and the alkali hydroxide and/or alkali metal of step c).

It may be advantageous to first bring the mixture of step a) into contact with the aqueous fluid of step b) and then add the alkali hydroxide and/or alkali metal of step c). Thus, according to a preferred embodiment of step d), first the mixture of step a) is brought into contact with the aqueous fluid of step b) and then with the alkali hydroxide and/or alkali metal of step c). According to a more preferred embodiment of step d), first the mixture of step a) is mixed with the aqueous fluid of step b) and then with the alkali hydroxide and/or alkali metal of step c).

The provided substances can be brought into contact in one or more reactors. For example, the provided substances can be mixed in a mixing unit. It is also possible to mix the substances one after another in two different mixing units. Corresponding reactors and devices are familiar to the skilled person. According to one embodiment of the present invention, the mixture of step a) is first mixed with the aqueous fluid of step b) in a first mixing unit, followed by mixing the obtained composition with the alkali hydroxide and/or alkali metal of step c) in a second mixing unit.

Preferably, the reactor(s) is/are equipped with a stirring device. Furthermore, the reactor(s) may be equipped with one or more pumping devices and/or devices for solids addition. Such reactors and devices are familiar to the skilled person.

It is also possible to bring the provided materials directly into contact in a reactor, which can then also be used under the conditions of step e). This can be, for example, a pressure reactor or a hydrothermal reactor.

It may also be advantageous to heat the composition obtained in step d) to increase the homogeneity of the composition obtained in step d) and/or the solubility of the added solids.

Consequently, step d) includes, according to one embodiment, heating the obtained composition. For example, the obtained composition can be heated to a temperature in the range of 25° C. to 100° C.

Step e)

In step e) of the inventive process, the composition obtained in step d) is subjected to a reduced or increased temperature and/or a reduced or increased pressure. The expression "reduced" or "increased" is to be understood to refer to a temperature of 20° C. and/or a pressure of 1.013 bar as reference points.

Step (e) can be described as a leaching process, i.e. a type of liquid-solid extraction, in which a more soluble fraction, i.e. the inorganic compounds, is completely or partially removed from an insoluble, permeable solid phase, in which the carbonaceous solid is present. Different conditions may be indicated for such a process, depending on the starting materials and reagents used for the process.

According to one embodiment of the present invention, the composition in step e) is subjected to a temperature of −35° C. to 400° C., preferably of 25° C. to 300° C., and more preferably of 80° C. to 240° C., and/or the composition in step e) is subjected to a pressure of 0.001 to 200 bar, preferably of 1 to 100 bar, and more preferably of 5 to 50 bar, and/or the pH of the composition in step e) is adjusted to a value of 0 to 14, preferably of 7 to 14, and more preferably of 9 to 13.

According to another embodiment of the present invention, in step e) the composition is subjected to a temperature of −35° C. to 400° C., preferably 25° C. to 300° C., and more preferably 80° C. to 240° C., and a pressure of 0.001 to 200 bar, preferably 1 to 100 bar, and more preferably 5 to 50 bar, and the pH of the composition is adjusted to a value of 0 to 14, preferably 7 to 14, and more preferably 9 to 13.

According to a preferred embodiment, the composition obtained in step d) is subjected to an elevated temperature and/or pressure. According to a preferred embodiment of the present invention, the composition in step e) is subjected to a temperature of 50° C. to 400° C., and a pressure of 2 to 200 bar. According to a preferred embodiment of the present invention, the composition in step e) is subjected to a temperature of 80° C. to 400° C., and a pressure of 5 to 200 bar.

According to a preferred embodiment of the present invention, the composition in step e) is subjected to a temperature of 80° C. to 240° C., and a pressure of 5 to 50 bar, and the pH of the composition is adjusted to a value of 9 to 13.

The period of time for a complete treatment of the composition according to step e) can be determined by the skilled person. Common quantitative and qualitative analytical methods such as conductivity measurement, pH measurement, mass spectrometry, powder diffraction etc. can be used for this purpose.

In one embodiment, step e) is performed over a period of time in the range of 1 min to 24 h, preferably in the range of 5 min and 10 h, and more preferably in the range of 15 min and 2 h.

Step e) of the inventive step may also be carried out stepwise. This means that the composition obtained in step d) can first be subjected to a first condition of temperature and/or pressure, followed by a second condition of a different temperature and/or pressure. It is understood that such a stepwise process is not limited to two steps, but may also comprise three or more steps. The inventors have surprisingly found that a two or more step process can improve the extraction of certain inorganic compounds from the composition to be treated. For example, amorphous silica can be extracted from the composition in one step and crystalline silica in another step of the process.

In one embodiment of the present invention, step e) is carried out stepwise under at least two different conditions of temperature, pressure and/or pH, preferably under at least two different conditions of temperature and pressure.

In one embodiment of the present invention, step e) is carried out in two or more steps, each step having a different temperature and/or pressure. For example, step e) may be a two-step process in which in the first step the composition obtained in step d) is subjected to a temperature in the range of 100 to 200° C., preferably in the range of 160 to 180° C., and a pressure of in the range of 0.01 to 50 bar (e.g. in the range of 2 to 50 bar), preferably of from 0.1 to 15 bar (e.g. in the range of from 2 to 15 bar), followed by a second step at a temperature in the range of 150 to 300° C., preferably in the range of 180 to 200° C., and a pressure in the range of 0.01 to 50 bar (e.g. in the range of 2 to 50 bar), preferably of 10 to 20 bar.

It is also possible to add additional aqueous fluid of step b) and/or additional alkali hydroxide and/or alkali metal of step c) to the composition in step e). According to one embodiment, step e) includes the addition of additional aqueous fluid according to step b) and/or additional alkali hydroxide and/or alkali metal according to step c).

It is also possible to remove the aqueous phase before adding additional aqueous fluid according to step b) and/or additional alkali hydroxide and/or alkali metal according to step c). According to one embodiment, step e) includes the removal of the aqueous phase, followed by the addition of additional aqueous fluid according to step b) and/or of additional alkali hydroxide and/or alkali metal according to step c).

Step e) can be carried out in a reactor designed for temperatures from −35° C. to 400° C. and pressures from 0.001 to 200 bar. Such reactors are known to the skilled person. For example, step e) can be carried out in a pressure reactor or a hydrothermal reactor. Furthermore, step e) can be carried out in a batch reactor, semi-batch reactor or a flow-through reactor, preferably a batch reactor or semi-batch reactor.

Step f)

In step f) of the inventive process, a carbonaceous solid is separated from the composition obtained in step e).

The carbonaceous solid can be separated by filtration. According to a preferred embodiment, step f includes the filtration of the carbonaceous solid. In such case, a carbonaceous solid is obtained as a residue, and an aqueous filtrate is obtained.

The skilled person selects the appropriate means for filtration. For example, carbonaceous solids can be separated by mechanical filtration through a filter membrane. Suitable filter membranes are for example microfiltration membranes. In one embodiment, a filter membrane is used which has an average pore diameter of more than 1 μm, preferably from 1 to 100 μm, more preferably from 1 to 50 μm, and most preferably from 1 to 20 μm.

The inventors of the present invention have surprisingly found that the carbonaceous solid of step f has the same physical properties or only slightly different physical properties than the carbonaceous solid being present in the mixture of step a). Consequently, the carbonaceous solid being present in the mixture of step (a) can be obtained in step (f in unchanged form, or only slightly modified form.

According to one embodiment, the carbonaceous solid of step (f has the same physical characteristics, or only slightly different physical characteristics than the carbonaceous solid being present in the mixture of step (a). According to one embodiment, the carbonaceous solid of step f) has the same, or only slightly different morphology than the carbonaceous solid being present in the mixture of step a). The "morphology" of the carbonaceous solid in the meaning of the present invention refers to the structure and/or shape of the material. The structure and/or shape of the material can be determined, for example, by means of scanning electron microscopy (morphology), laser diffraction (particle size) or Raman spectroscopy (structure).

According to one embodiment of the present invention, the carbonaceous solid of step f) consists of at least 80% (e.g. in the range of 80 to 99.8%), preferably at least 90%, more preferably at least 95% (e.g. in the range of 95 to 99.8%), of carbon, and preferably carbon black,
    and/or the separated carbonaceous solid of step f) is present together with inorganic compounds in an amount of below 5.0 wt. % (e.g. in the range of 0.01 to below 5.0 wt. %), preferably below 2.0 wt. %, and more preferably below 1.0 wt. %, based on the total weight of the separated carbonaceous solid and inorganic compounds.

According to one embodiment of the present invention, the carbonaceous solid of step f) consists of at least 80% (e.g. in the range of 80 to 99.8%), preferably at least 90%, more preferably at least 95% (e.g. in the range of 95 to 99.8%), of carbon.

According to one embodiment of the present invention, the carbonaceous solid of step f) consists of at least 80% (e.g. in the range of 80 to 99.8%), preferably at least 90%, more preferably at least 95% (e.g. in the range of 95 to 99.8%), of carbon, and preferably carbon black, and is present together with inorganic compounds of less than 5.0 wt. % (e.g. in the range of 0.01 to below 5.0 wt. %), preferably less than 2.0 wt. %, and more preferably less than 1.0 wt. %, based on the total weight of the separated carbonaceous solid and inorganic compounds.

According to one embodiment of the present invention, the carbonaceous solid of step f) consists of at least 80% (e.g. in the range of 80 to 99.8%), preferably at least 90%, more preferably at least 95% (e.g. in the range of 95 to 99.8%), of carbon black.

According to one embodiment of the present invention, the carbonaceous solid of step f) consists of at least 80%, preferably at least 90% (e.g. in the range of 80 to 99.8%), more preferably at least 95% (e.g. in the range of 95 to 99.8%), of carbon, and preferably carbon black, and is present together with inorganic compounds of less than 5.0 wt. % (e.g. in the range of 0.01 to below 5.0 wt. %), preferably less than 2.0 wt. %, and more preferably less than 1.0 wt. %, based on the total weight of the separated carbonaceous solid and inorganic compounds.

According to one embodiment of the present invention, the carbonaceous solid of step f) consists of at least 80% (e.g. in the range of 80 to 99.8%), preferably at least 90%, more preferably at least 95%, of carbon (e.g. in the range of 95 to 99.8%), and preferably carbon black, and together with inorganic compounds of less than 5.0% by weight (e.g. in the range of 0.01 to below 5.0 wt. %), preferably less than 2.0% by weight, and more preferably below 1.0% by weight, based on the total weight of the separated carbonaceous solid and inorganic compounds, wherein the inorganic compounds are selected from the group consisting of one or more metal sulphides, one or more metal oxides, one or more silicates and mixtures thereof.

It is particularly preferred that the carbonaceous solid separated in step f) comprises carbon black, or consists of carbon black. For example, the carbonaceous solid may consist of at least 90%, preferably at least 95% (e.g. in the range of 95 to 99.8%), carbon black. The physical and chemical properties of carbon black are known to the skilled person. For example, the primary particles of carbon black can have a particle diameter in the range of 1 to 600 nm, preferably 10 to 300 nm. The grain diameter of the primary particles can be measured by laser diffraction. The primary particles of carbon black can combine to form carbon black aggregates, which can have a diameter in the range of 80 to 800 nm. These carbon black aggregates can in turn form superstructures in the form of carbon black agglomerates. Furthermore, the carbon black can have a specific surface area in the range of 5 to 1500 $m^2/g$, preferably 15 to 600 $m^2/g$, measured according to the BET method. In one embodiment of the present invention, the carbonaceous solid according to step f) consists of carbon black comprising an elemental composition of 90.0 to 99.7% C, 0.1 to 0.6% H, 0.01 to 0.8% S and 0.2 to 3.5% O.

Optional Process Steps

In addition to step a) to step f, the process according to the present invention may comprise further process steps.

In step f) of the present invention, an aqueous phase is formed after separation of the carbonaceous solid. The process may include additional steps to work up the aqueous phase. Thereby, further valuable raw materials can be obtained and/or recovered. Usually this aqueous phase obtained in step f) contains at least the nitrogen hydride and/or reaction products thereof, hydroxide compounds, and inorganic compounds and/or reaction products thereof. Depending on which composition is chosen for the aqueous fluid, the aqueous phase obtained in step f) may also contain other substances. For ecological and/or economic reasons, it may be appropriate to separate the nitrogen hydride and/or reaction products thereof, hydroxide compounds and inorganic compounds and/or reaction products thereof from the obtained aqueous phase.

According to one embodiment, the process additionally comprises a step g) of treating and/or recycling an aqueous phase obtained in step 0.

According to one embodiment, step g) comprises the following steps:
    g1) separating the nitrogen hydride according to step b) and/or reaction products thereof, and/or
    g2) separating one or more inorganic compounds according to step a) and/or reaction products thereof, and/or
    g3) recovering the process water.

According to one embodiment, step g) comprises the following steps:
    g1) separating the nitrogen hydride according to step b) and/or reaction products thereof, and g2) separating one or more inorganic compounds according to step a) and/or reaction products thereof, and
g3) recovering the process water.

According to one embodiment, step g) comprises the following steps:
g1) separating the nitrogen hydride according to step b) and/or reaction products thereof, and
g2) separating one or more inorganic compounds according to step a) and/or reaction products thereof from the composition obtained in step g1), and
g3) recovering the process water from the composition obtained in step g2)

According to another embodiment, step g) comprises the following steps:
g1) separating the nitrogen hydride and/or reaction products, namely one or more ammonium salts, and
g2) separating one or more inorganic compounds according to step a) and/or reaction products thereof, namely one or more sodium silicates from the composition obtained in step g1), and
g3) recovering the process water from the composition obtained in step g2)

Steps g1), g2) and/or g3) can be carried out with techniques and devices known to the skilled person.

Use

Another aspect of the present invention is the use of a nitrogen hydride as a dispersing agent for producing and/or stabilizing an aqueous suspension comprising a carbonaceous solid and at least one inorganic compound.

The term "generation and/or stabilization of an aqueous suspension" in the meaning of the present invention means that a mixture of a solid and liquid phase can be generated in which the solid phase can be mixed in the dispersing medium without precipitating, forming higher aggregates and/or settling.

The inventors have surprisingly found that a nitrogen hydride can be used to stabilize an aqueous dispersion or suspension which contains a mixture comprising a carbonaceous solid and at least one inorganic compound.

Preferred embodiments of the aqueous fluid, and of the mixture comprising a carbonaceous solid and at least one inorganic compound, are described above in the description of step a) and step b) of the inventive process.

In one embodiment, the nitrogen hydride is used as a dispersant for forming and/or stabilizing an aqueous suspension comprising a carbonaceous solid and at least one inorganic compound, wherein the carbonaceous solid is at least 90% carbon black (e.g. in the range of 90 to 99.5%), and wherein the at least one inorganic compound refers to multiple inorganic compounds selected from the group consisting of one or more metal sulphides, one or more metal oxides, one or more silicates, and mixtures thereof.

In one embodiment, the nitrogen hydride is used as a dispersant for producing and/or stabilizing an aqueous suspension comprising a carbonaceous solid and at least one inorganic compound, wherein the carbonaceous solid is at least 90% carbon black (e.g. in the range of 90 to 99.5%), wherein the at least one inorganic compound refers to a plurality of inorganic compounds selected from the group consisting of one or more metal sulphides, one or more metal oxides, one or more silicates and mixtures thereof, and wherein the nitrogen hydride is selected from the group consisting of ammonia, inorganic ammonium salts, primary or secondary organic amines and ammonium salts thereof, and mixtures thereof, preferably from the group consisting of ammonia, ammonium hydroxide, ammonium halides, guanidine, guanidine derivatives and ammonium salts thereof, and mixtures thereof, more preferably one nitrogen hydride ammonia and/or ammonium hydroxide, and most preferably ammonium hydroxide.

FURTHER EMBODIMENTS

In a preferred embodiment, the inventive process for the processing and/or purification of carbonaceous solids comprises the steps of:
a) providing a mixture comprising a carbonaceous solid, preferably carbon black, and at least one inorganic compound, wherein the mixture comprises the carbonaceous solid in an amount of from 70 to 99 wt. %, and more preferably from 80 to 98 wt. %, based on the total weight of the carbonaceous solid and the at least one inorganic compound, and comprises the at least one inorganic compound in an amount of from 1 to 30 wt. %, preferably from 2 to 20 wt. %, based on the total weight of the carbonaceous solid and the at least one inorganic compound,
b) providing an aqueous fluid comprising a nitrogen hydride,
c) Provision of an alkali hydroxide, preferably NaOH
d) contacting the mixture of step a), the fluid of step b) and the alkali metal hydroxide and/or alkali metal of step c)
e) subjecting the composition obtained in step d) to an elevated temperature in the range of 80 to 240° C. and an elevated pressure in the range of 5 to 50 bar,
f) separating a carbonaceous solid from the composition obtained in step e), wherein the carbonaceous solid of step f consists of at least 80%, preferably at least 90%, more preferably at least 95% (e.g. in the range of 95 to 99.5%), of carbon, and preferably carbon black, and is present together with inorganic compounds of less than 5.0 wt. % (e.g. in the range of 0.01 to 5 wt. %), preferably less than 2.0 wt. %, and more preferably less than 1.0 wt. %, based on the total weight of the separated carbonaceous solid and inorganic compounds.

Further aspects and embodiments of the present invention are:

[1] A process for processing and/or purifying carbonaceous solids comprising the steps of:
a) providing a mixture comprising a carbonaceous solid and at least one inorganic compound,
b) providing an aqueous fluid comprising a nitrogen hydride,
(c) providing an alkali hydroxide and/or an alkali metal,
d) contacting the mixture of step a), the fluid of step b) and the alkali metal hydroxide and/or alkali metal of step c),
e) subjecting the composition obtained in step d) to a reduced or increased temperature and/or to a reduced or increased pressure,
f) separating a carbonaceous solid from the composition obtained in step e).

[2] The process according to paragraph [1], wherein the mixture of step a) comprises
the carbonaceous solid in an amount of above 50 wt. %, preferably above 70 wt. %, and more preferably above 80 wt. %, based on the total weight of the mixture, and/or
wherein the mixture of step a) comprises the at least one inorganic compound in an amount of from 1 to 30 wt. %, preferably from 5 to 20 wt. %, based on the total weight of the mixture.

[3] The process according to paragraph [1] or [2], where the mixture of step a) is a solid mixture, and/or wherein the mixture of step a) is obtained by pyrolysis of a carbonaceous material, preferably scrap tyres or biomass.

[4] The process according to any of the preceding paragraphs [1] to [3], where the carbonaceous solid consists of at least 80%, preferably at least 90%, more preferably at least 95%, of carbon, and preferably carbon black, and/or
wherein the at least one inorganic compound is at least one mineral and/or salt, preferably selected from the group consisting of one or more metal sulphides, one or more metal oxides, one or more silicates and mixtures thereof.

[5] The process according to any of the preceding paragraphs [1] to [4], wherein the fluid of step b) comprises a nitrogen hydride selected from the group consisting of ammonia, inorganic ammonium salts, primary or secondary organic amines and ammonium salts thereof, and mixtures thereof, preferably from the group consisting of ammonia, ammonium hydroxide, ammonium halides, guanidine, guanidine derivatives and ammonium salts thereof, and mixtures thereof, more preferably the nitrogen hydride is ammonia and/or ammonium hydroxide, and most preferably ammonium hydroxide; and/or
wherein the fluid of step b) additionally comprises one or more substances selected from the group consisting of alcohols, oxidizing agents, acids, nitrates and carbonates.

[6] The process according to one of the preceding paragraphs [1] to [5], wherein the alkali hydroxide and/or alkali metal in step c) is provided in a molar ratio to the inorganic compounds of the mixture of step a) in the range of from 0.25:1 to 2:1, preferably from 0.5:1 to 1.5:1, more preferably from 0.75:1 to 1.25:1, and most preferably from 0.95:1 to 1.05:1, and/or
wherein the fluid in step b) is provided in an amount ranging from 2 L (fluid)/1 kg (mixture of step a)) to 200 L (fluid)/1 kg (mixture of step a)), preferably 5 L (fluid)/1 kg (mixture of step a)) to 150 L (fluid)/1 kg (mixture of step a)), and more preferably 10 L (fluid)/1 kg (mixture of step a)) to 100 L (fluid)/1 kg (mixture of step a)).

[7] The process according to one of the preceding paragraphs [1] to [6], wherein the composition in step e) is subjected to a temperature of −35° C. to 400° C., preferably 25° C. to 300° C., and more preferably 80° C. to 240° C., and/or
wherein the composition in step e) is subjected to a pressure of 0.001 to 200 bar, preferably of 1 to 100 bar, and more preferably of 5 to 50 bar, and/or
wherein the pH of the composition in step e) is adjusted to a value of 0 to 14, preferably from 7 to 14, and more preferably from 9 to 13.

[8] The process according to one of the preceding paragraphs [1] to [7], wherein step e) is carried out stepwise under at least two different conditions of temperature, pressure and/or pH, preferably under at least two different conditions of temperature and pressure, and/or
wherein step f) comprises the filtration of the carbonaceous solid.

[9] The process according to one of the preceding paragraphs [1] to [8], wherein the carbonaceous solid of step f consists of at least 80%, preferably at least 90%, more preferably at least 95%, carbon, and preferably carbon black, and/or
wherein the separated carbonaceous solid of step f) is present together with inorganic compounds in an amount of less than 5.0 wt. %, preferably less than 2.0 wt. %, and more preferably less than 1.0 wt. %, based on the total weight of the separated carbonaceous solid and the inorganic compounds.

[10] Use of a nitrogen hydride as a dispersant for producing and/or stabilizing an aqueous suspension comprising a carbonaceous solid and at least one inorganic compound.

EXAMPLES

The present invention is further described by the following examples:

|  | Example 1 | Example 2 |
|---|---|---|
| Amount of mixture according to step a) (recovered carbon black) | 1 g | 60 g |
| Amount of fluid according to step b) (aqueous $NH_4OH$ solution.) | 50 mL | 2.5 L |
| Concentration of the fluid ($NH_4OH$ mol/L) | 0.09 mol/L | 0.1 mol/L |
| Alkali hydroxide according to step c) | 0.135 g NaOH | 12 g NaOH |
| Pressure | 8.2 bar | 11.2 bar |
| Temperature ($T_{max}$) | 160° C. | 180° C. |
| Holding time of $T_{max}$ | 30 min | 30 min |

The mixture according to step a) was a mixture obtained by pyrolysis of scrap tyres.

The invention claimed is:

1. A process for processing and/or purifying carbonaceous solids comprising:
   a) providing a mixture comprising a carbonaceous solid and at least one inorganic compound, wherein the carbonaceous solid comprises carbon black,
   b) providing an aqueous fluid comprising a nitrogen hydride,
   c) providing an alkali hydroxide and/or an alkali metal
   d) contacting the mixture of step a), the fluid of step b) and the alkali metal hydroxide and/or alkali metal of step c)
   e) subjecting the composition obtained in step d) to a reduced or increased temperature and/or to a reduced or increased pressure
   f) separating a carbonaceous solid from the composition obtained in step e).

2. The process according to claim 1, wherein the mixture of step a) comprises the carbonaceous solid in an amount of from 50 to 99 wt. % based on a total weight of the mixture.

3. The process according to claim 2, wherein the mixture of step a) comprises the at least one inorganic compound in an amount of from 1 to 30 wt. %, based on the total weight of the mixture.

4. The process according to claim 1,
wherein the mixture of step a) is obtained by pyrolysis of scrap tyres.

5. The process according to claim 1, wherein the fluid of step b) comprises a nitrogen hydride selected from the group consisting of ammonia, inorganic ammonium salts, primary or secondary organic amines and ammonium salts thereof, and mixtures thereof.

6. The process according to claim 5, wherein the fluid comprises ammonia and/or ammonium hydroxide.

7. The process according to claim 1, wherein the alkali hydroxide and/or alkali metal in step c) is provided in a molar ratio to the inorganic compounds of the mixture of step a) in the range of from 0.25:1 to 2:1, and/or wherein the fluid in step b) is provided in an amount ranging from 2 L of fluid per 1 kg of the mixture of step a to 200 L of fluid per 1 kg of the mixture of step a).

8. The process according to claim 1, wherein step e) is carried out stepwise under at least two different conditions of temperature and pressure.

9. The process according to claim 1, wherein the separated carbonaceous solid of step f) is present together with inorganic compounds in an amount of from 0.001 to 5.0 wt. %, based on the total weight of the separated carbonaceous solid and the inorganic compounds.

10. The process according to claim 1, comprising a step g) of treating and/or working-up an aqueous phase obtained in step f), comprising the following steps:
   g1) separating the nitrogen hydride according to step b) and/or reaction products thereof, and
   g2) separating one or more inorganic compounds according to step a) and/or reaction products thereof, and
   g3) recovering the process water.

11. The process according to claim 10, wherein step g1) comprises separating one or more ammonium salts, and
   wherein step g2) comprises separating one or more sodium silicates from the composition obtained in step g1), and
   wherein step g3) comprises recovering the process water from the composition obtained in step g2).

12. The process according to claim 1, wherein the aqueous fluid of step b) has a concentration of nitrogen hydride in the range of 0.05 to 5 mol/L.

13. The process according to claim 1, wherein the at least one inorganic compound of step a) comprises two or more inorganic compounds which are at least poorly water soluble.

14. The process according to claim 1, wherein the pH of the composition in step e) is adjusted to a value of 9 to 13.

15. The process according to claim 1, wherein an alkali hydroxide is provided in step c).

16. The process according to claim 1, wherein the at least one inorganic compound is two or more inorganic compounds comprising zinc sulphide, zinc oxide, silicon dioxide, silicates, aluminum oxide, or mixtures thereof.

17. The process according to claim 1, wherein the composition in step e) is subjected to an increased temperature and an increased pressure.

18. The process according to claim 17, wherein the increased temperature is a temperature in a range of 80° C. to 240° C.

19. The process according to claim 17, wherein the increased pressure is a pressure in a range of 5 to 50 bar.

20. A process for processing and/or purifying carbonaceous solids comprising:
   a) providing a mixture comprising a carbonaceous solid and inorganic compounds, wherein the carbonaceous solid comprises carbon black, and the inorganic compounds comprise zinc sulphide, zinc oxide, silicon dioxide, silicates, aluminum oxide, or any mixture thereof;
   b) providing an aqueous fluid comprising a nitrogen hydride, wherein the nitrogen hydride is selected from the group consisting of ammonia, ammonium hydroxide, ammonium halides, guanidine, guanidine derivatives, and ammonium salts thereof;
   c) providing an alkali hydroxide;
   d) contacting the mixture of step a), the fluid of step b) and the alkali metal hydroxide of step c);
   e) subjecting the composition obtained in step d) to an increased temperature and an increased pressure; and
   f) separating a carbonaceous solid from the composition obtained in step e).

* * * * *